(12) United States Patent
Botros

(10) Patent No.: US 8,637,159 B2
(45) Date of Patent: Jan. 28, 2014

(54) GRAFT COMPOSITION FOR IMPROVED TIE LAYERS

(75) Inventor: Maged G. Botros, Liberty Township, OH (US)

(73) Assignee: Equistar Chemicals, LP, Houston, TX (US)

( * ) Notice: Subject to any disclaimer, the term of this patent is extended or adjusted under 35 U.S.C. 154(b) by 219 days.

(21) Appl. No.: 12/924,540

(22) Filed: Sep. 29, 2010

(65) Prior Publication Data

US 2012/0077048 A1    Mar. 29, 2012

(51) Int. Cl.
  *B32B 27/08*    (2006.01)
  *C08G 63/91*    (2006.01)
  *C08L 51/06*    (2006.01)

(52) U.S. Cl.
  USPC ........... 428/516; 428/517; 428/519; 428/523; 525/70; 525/74

(58) Field of Classification Search
  None
  See application file for complete search history.

(56) References Cited

U.S. PATENT DOCUMENTS

| | | | |
|---|---|---|---|
| 4,198,327 A | 4/1980 | Matsumoto et al. | |
| 4,619,972 A * | 10/1986 | Inoue et al. | 525/193 |
| 7,064,163 B2 | 6/2006 | Shida | |
| 2004/0034166 A1 | 2/2004 | Botros | |
| 2004/0097637 A1 | 5/2004 | Botros | |
| 2004/0116610 A1* | 6/2004 | Torres et al. | 525/242 |
| 2006/0194053 A1* | 8/2006 | Fink et al. | 428/400 |
| 2007/0054142 A1 | 3/2007 | Lee et al. | |
| 2007/0071988 A1 | 3/2007 | Botros | |
| 2007/0167569 A1 | 7/2007 | Botros | |
| 2008/0032148 A1 | 2/2008 | Lee et al. | |
| 2008/0163978 A1 | 7/2008 | Botros | |
| 2009/0035594 A1 | 2/2009 | Lee et al. | |
| 2010/0174036 A1 | 7/2010 | Lee et al. | |
| 2010/0304051 A1 | 12/2010 | Henschke et al. | |

FOREIGN PATENT DOCUMENTS

| | | |
|---|---|---|
| EP | 0014018 A1 | 8/1980 |
| GB | 1428553 A | 3/1976 |
| WO | 96/30455 A1 | 10/1996 |
| WO | 2009/035885 A1 | 3/2009 |

* cited by examiner

*Primary Examiner* — Monique Jackson

(57) ABSTRACT

Graft compositions, useful for tie-layer adhesives, are disclosed. The graft compositions comprise the reaction product of a live, grafted polyolefin and an olefin elastomer. The grafted polyolefin is first made by heating a polyolefin and an unsaturated monomer. Further reaction of the live, grafted polyolefin with an olefin elastomer provides the graft composition. Grafting efficiency is boosted dramatically by the presence of the olefin elastomer and use of the additional reaction step. The graft composition, when formulated into a tie-layer adhesive at low concentration, affords multilayer structures with good adhesion and high clarity.

20 Claims, No Drawings

GRAFT COMPOSITION FOR IMPROVED TIE LAYERS

FIELD OF THE INVENTION

The invention relates to grafted compositions, particularly compositions useful in tie-layer adhesives for the manufacture of multilayer structures.

BACKGROUND OF THE INVENTION

Tie-layer adhesives are used to bond polyolefins to dissimilar substrates in multilayer, co-extruded structures, particularly for blown and cast film, extrusion coating, blow molding, sheet extrusion, wire & cable, pipe, and other industrial applications. The tie-layer adhesive typically comprises a polyolefin base resin, which is the predominant component, and a grafted polyolefin. The grafted polyolefin is produced by reacting a polyolefin with an unsaturated monomer at elevated temperatures with or without a free-radical initiator. Commercially available tie-layer adhesives include Plexar® resins, product of Equistar Chemicals, LP, which are anhydride-modified polyolefins.

In addition to the base resin and grafted polyolefin, tie-layer adhesives commonly include other polymer resins or additives to provide better adhesion, clarity, or other benefits. Usually, there are tradeoffs. For instance, modifications that improve adhesion often reduce clarity, and vice versa.

Elastomers—random or block copolymers—are commonly included in tie-layer adhesive compositions to improve compatibility, increase adhesion, or impart other benefits. Styrene-based block copolymers, for instance, have been used to improve adhesion in multilayer constructions that require bonding of polyethylene to a styrenic polymer (U.S. Pat. Appl. Publ. Nos. 2007/0071988 and 2007/0167569).

Other commonly used elastomers include olefin elastomers, such as ethylene-propylene rubber (EPR) or ethylene-propylene-diene monomer rubber (EPDM). Many references teach to blend an olefin elastomer with other tie-layer adhesive components (see, e.g., U.S. Pat. Appl. Publ. Nos. 2004/0097637, 2008/0032148, 2009/0035594, and 2010/0174036), but none of these references suggests reacting the olefin elastomer with the grafted polyolefin during the manufacture of the grafted polyolefin.

Clarity of multilayer films is often an issue, particularly for the food packaging industry. Wraps for meat and cheese, snack foods, baking mixes, and many others uses require barrier layers (e.g., EVOH, polyamides, polyolefins) to prevent transmission of oxygen and/or moisture, and making such structures with high clarity poses a formidable challenge. Additives, such as the bicyclic modifiers of U.S. Pat. Appl. Publ. No. 2007/0054142, are sometimes employed to improve clarity without sacrificing adhesion.

U.S. Pat. Appl. Publ. No. 2010/0174036 teaches that tie-layer adhesives useful for multilayer films having a favorable balance of clarity and adhesion can be made by blending, in sequence, a grafted ("maleated") polyolefin, a polyolefin elastomer, and LLDPE. Again, there is no suggestion to react the polyolefin elastomer with the grafted polyolefin.

Improved tie-layer adhesive compositions suitable for use in making multilayer structures with good adhesion and high clarity are needed. A valuable approach would avoid expensive additives and performance tradeoffs. Ideally, improved tie-layer adhesives could be made using economical starting materials, commonly used equipment, and familiar techniques.

SUMMARY OF THE INVENTION

In one aspect, the invention relates to graft compositions (hereinafter also sometimes referred to as "graft [polyolefin/elastomer] compositions") useful for tie-layer adhesives. The compositions comprise the reaction product of a live, grafted polyolefin and an olefin elastomer. In another aspect, the invention relates to a process for making graft compositions. The process comprises heating a polyolefin and an unsaturated monomer under conditions effective to produce a live, grafted polyolefin, and then further reacting the grafted polyolefin and any residual polyolefin and/or unsaturated monomer with an olefin elastomer. Surprisingly, grafting efficiency is boosted dramatically by the presence of the olefin elastomer and use of the additional reaction step. The invention includes tie-layer adhesives that include the graft compositions and multilayer films and sheets that incorporate the adhesives. The graft composition, when formulated into a tie-layer adhesive at relatively low concentration, affords multilayer structures with an unexpected combination of good adhesion and high clarity.

DETAILED DESCRIPTION OF THE INVENTION

Graft compositions of the invention comprise reaction products of a live, grafted polyolefin and an olefin elastomer.

Live, grafted polyolefins suitable for use in making the graft compositions are manufactured by reacting polyolefins with unsaturated monomers at elevated temperatures, with or without a free-radical initiator, under conditions effective to graft unsaturated monomer units onto the polyolefin backbone.

Polyolefins suitable for making the live, grafted polyolefins include high density polyethylenes (HDPE), medium density polyethylenes (MDPE), low density polyethylenes (LDPE), linear low density polyethylenes (LLDPE), polypropylenes, ethylene-propylene copolymers, impact-modified poly-propylenes, and the like, and blends thereof. Preferred polyolefins for making the grafted polyolefin are polyethylenes, particularly HDPE and LLDPE, and especially HDPE.

An unsaturated monomer reacts with the polyolefin to produce the grafted polyolefin. Suitable unsaturated monomers are also well known. Preferred unsaturated monomers are ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Maleic anhydride is particularly preferred. Other suitable unsaturated monomers are described in U.S. Pat. Appl. Publ. Nos. 2004/0097637 and 2007/0054142, the teachings of which are incorporated herein by reference.

The relative amounts of unsaturated monomer and polyolefin used will vary and depend on factors such as the nature of the polyolefin and unsaturated monomer, reaction conditions, available equipment, and other factors. Usually, the unsaturated monomer is used in an amount within the range of 0.1 to 15 wt. %, preferably from 0.5 to 6 wt. %, and most preferably from 1 to 3 wt. %, based on the amount of live, grafted polyolefin produced.

Grafting is accomplished according to known procedures, generally by heating a mixture of the polyolefin and unsaturated monomer(s). Most typically, the grafted polyolefin is prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are especially useful for performing the grafting step. A free-radical initiator such as an organic peroxide can be employed but is not necessary.

Grafting of the unsaturated monomer and polyolefin to generate the live, grafted polyolefin is performed at elevated temperatures, preferably within the range of 180° C. to 400° C., more preferably from 200° C. to 375° C., and most preferably from 230° C. to 350° C. Shear rates in the extruder can vary over a wide range, preferably from 30 to 1000 rpm, more preferably from 100 to 600 rpm, and most preferably from 200 to 400 rpm.

By "live, grafted polyolefin," we mean a grafted polyolefin that can further react with added olefin elastomer and any residual polyolefin, unsaturated monomer, and/or free-radical initiator used to make the grafted polyolefin. Commercially available grafted polyolefins are not "live" because the free-radical content has reacted out or has been quenched during workup of the product, typically during pelletization. A live, grafted polyolefin contains active free-radical species generated thermally by visbreaking or from peroxide decomposition. The residual radical content allows reaction to continue upon combination of the freshly made grafted polyolefin, usually while still molten, with an added olefin elastomer. One or more of the grafted polyolefin, olefin elastomer, residual polyolefin, and residual unsaturated monomer may be involved in this secondary reaction.

Thus, in the second process step for making the graft composition, the live, grafted polyolefin (and any residual polyolefin and/or unsaturated monomer) is reacted with an olefin elastomer. This reaction can be performed using any suitable reactor. Conveniently, the reaction is performed by combining the freshly prepared live, grafted polyolefin with the olefin elastomer in a shear-imparting extruder/reactor as described earlier. In one particularly preferred approach, the live, grafted polyolefin is transferred while still molten from an outlet of a first extruder directly to a second extruder in which a reaction with the olefin elastomer occurs.

The amount of olefin elastomer used depends on the nature of the elastomer and grafted polyolefin, the desired tie-layer properties, reaction conditions, equipment, and other factors. Generally, however, the amount of elastomer used will be in the range of 5 to 60 wt. %, more preferably from 20 to 50 wt. %, and most preferably from 30 to 40 wt. %, based on the amount of graft composition produced.

The live, grafted polyolefin and the olefin elastomer react at elevated temperature, preferably at temperatures within the range of 120° C. to 300° C., more preferably from 135° C. to 260° C., and most preferably from 150° C. to 230° C. Preferably, the temperature for the reaction used to make this graft composition is lower than that used to make the live, grafted polyolefin. Shear rates in the extruder for this step can vary over a wide range, preferably from 30 to 1000 rpm, more preferably from 100 to 600 rpm, and most preferably from 200 to 400 rpm.

The resulting graft [polyolefin/elastomer] composition is conveniently quenched and pelletized at this point, but it can be combined immediately after preparation with base resin as is described further below.

Suitable olefin elastomers include ethylene-propylene rubber (EPR), ethylene-propylene-diene monomer rubber (EPDM), the like, and mixtures thereof. As used herein, "elastomer" refers to products having rubber-like properties and little or no crystallinity. Preferably, the olefin elastomers contain from 10 to 80 wt. % of ethylene recurring units. More preferred olefin elastomers contain from 10 to 70 wt. ° A) of ethylene units. Commercially available olefin elastomers include Lanxess Corporation's Buna® EP T2070 (68% ethylene, 32% propylene); Buna EP T2370 (3% ethylidene norbornene, 72% ethylene, 25% propylene); Buna EP T2460 (4% ethylidene norbornene, 62% ethylene, and 34% propylene); ExxonMobil Chemical's Vistalon® 707 (72% ethylene, 28% propylene); Vistalon 722 (72% ethylene, 28% propylene); and Vistalon 828 (60% ethylene, 40% propylene). Suitable ethylene-propylene elastomers also include ExxonMobil Chemical's Vistamaxx® elastomers, particularly grades 6100, 1100, and 3000, and Dow Chemical's Versify® elastomers, particularly grades DP3200.01, DP3300.01, and DP3400.01, which have ethylene contents of 9, 12, and 15 wt %, respectively. Additional EPDM rubbers include Dow's Nordel™ hydrocarbon rubber, e.g., the 3722P, 4760P, and 4770R grades.

I surprisingly found that high grafting efficiencies can be achieved when live, grafted polyolefins are further reacted with an olefin elastomer. Normally, polyolefin grafting proceeds less than quantitatively. For instance, in a typical process for grafting maleic anhydride onto high density polyethylene, the efficiency usually ranges from 80 to 85% (see Comparative Examples 5-11). In contrast, nearly quantitative conversion of the unsaturated monomer can be accomplished when a live, grafted polyolefin is further reacted with an olefin elastomer (see Example A, below).

Preferably, at least 90 wt. %, more preferably at least 95 wt. %, and most preferably at least 98 wt. %, of the unsaturated monomer is incorporated into the graft composition. The amount incorporated can be measured by wet chemical methods (titration, etc.) or more preferably by Fourier transform infrared spectroscopy (FTIR) according to methods that are well known in the art.

The graft composition preferably exhibits a weak but characteristic absorption, possibly a carbonyl absorption, in the infrared spectrum within the range of 1700 to 1750 cm$^{-1}$, preferably from 1725 to 1735 cm$^{-1}$, and most preferably at approximately 1730 cm$^{-1}$.

The graft composition is a valuable component of a tie-layer adhesive. Tie-layer adhesives of the invention comprise from 2 to 50 wt. % of the graft [polyolefin/elastomer] and from 50 to 98 wt. % of a base resin (also called a "let-down" resin). More preferred tie-layer adhesives comprise from 5 to 30 wt. % of the graft composition and from 70 to 95 wt. % of the base resin. Most preferred adhesives comprise from 15 to 25 wt. % of the graft composition and from 75 to 85 wt. % of the base resin. An advantage of the graft compositions, elaborated upon later, is the ability to use a relatively low concentration in the tie-layer adhesives while achieving good adhesion and high clarity (see Examples 1-4 below).

Suitable base resins for the tie-layer adhesives include ethylene homopolymers; copolymers of ethylene with $C_3$-$C_8$ α-olefins, vinyl carboxylates and alkyl acrylates; terpolymers of ethylene and propylene with diene monomers; propylene homopolymers; polyisobutylene; and copolymers of isobutylene and isoprene. Ethylene homopolymers and copolymers can include LDPE; MDPE; HDPE; LLDPE; very low density polyethylene; ultra low density polyethylene; ethylene-vinyl acetate (EVA) copolymers; ethylene-acrylate copolymers such as ethylene-ethyl acrylate copolymer and ethylene-n-butyl acrylate copolymers; and blends thereof.

LLDPE is a preferred base resin. In particular, the LLDPE is preferably a copolymer of ethylene and 1-butene, 1-hexene, or 1-octene. Preferably, the LLDPE has a density within the range of 0.895 to 0.925 g/cm$^3$ and a melt index (MI$_2$) within the range of 0.5 and 5 g/10 min, more preferably from 0.8 to 2.5 g/10 min. Suitable LLDPE base resins include the Petrothene® GA502, GA503, GA602, and GA616 series resins, which are products of Equistar Chemicals, LP.

In a preferred aspect, the process for making the graft [polyolefin/elastomer] composition is integrated with a process for making the base resin. In this process, freshly made polyethylene powder (e.g., LLDPE) is blended in line with the graft composition to generate a mixture that is useful as a masterbatch or as a tie-layer adhesive. The graft composition can be in the form of pellets or it can be combined with the base resin powder immediately after the graft composition is produced. In either case, the "in-line" process affords products with reduced thermal history and, frequently, improved properties (see U.S. Pat. No. 7,064,163, the teachings of which are incorporated herein by reference).

In addition to the base resin and the graft composition, the tie layer adhesive can include other commonly used components, including adhesion promoters, elastomeric polymers, UV inhibitors, antioxidants, thermal stabilizers, and the like. For some examples of these, see U.S. Pat. Appl. Publ. No. 2004/0097637, the teachings of which are incorporated herein by reference.

A particularly preferred tie-layer adhesive comprises from 5 to 30 wt. %, preferably from 15-25%, of a particular graft composition and 70-95 wt. %, preferably 75-85 wt. %, of LLDPE as the base resin. This graft composition is made by grafting maleic anhydride onto HDPE, followed by further reaction of the live, grafted polyolefin with EPR or EPDM, particularly EPR. Such compositions provide good adhesion and high clarity with less grafted material than is commonly needed when EPR or EPDM is simply blended with a grafted HDPE (see, e.g., Examples 1-4 and Comparative Examples 5-11, below).

The tie-layer adhesives are valuable for bonding dissimilar materials in multilayer constructions, particularly films, sheets, pipes and other products. In particular, the adhesives are useful for bonding plastic, wood, glass, paper, composite, and metal substrates. They can be used in lamination, extrusion (or coextrusion), sheet extrusion, extrusion coating, injection molding, blow molding, melt thermoforming, and other processes.

The adhesives are particularly valuable for making multilayer films and sheets, including barrier films. The multilayer films have at least two layers in addition to the adhesive layer, which bonds the other layers together. Usually, at least one layer serves as a barrier layer. Multilayer films, typically made by coextrusion, frequently include a polyolefin layer such as LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers, and the like. Barrier resins used are typically ethylene-vinyl alcohol (EVOH) or polyamide resins such as nylon.

Multilayer barrier films are widely used for food packaging, and in most of these applications, clarity and high adhesion are important. Food packaging applications include formed bags, pouches, and casings for packaging meat and poultry products. They can also be used for snack foods, cereals, baking mixes, and the like. They may also have utility for cook-in packaging.

Analysis of the interface between the adhesive and barrier layers in multilayer barrier structures reveals interesting attributes of the inventive tie layers. Scanning electron microscopy (SEM), for example, shows intimate, almost seamless bonding at the adhesive-EVOH interface. When a blend of grafted HDPE and EPR is used instead to make the adhesive, the interface is raised and more distinct. Differences are also apparent when atomic force microscopy (AFM) is used to analyze the interface. The inventive tie layers can provide a smooth, undisturbed, nearly flawless interface that is consistent with good adhesion and high clarity. In contrast, when a blend of grafted HDPE and EPR is used to make the adhesive, AFM shows that the interface includes a discrete inter-phase region between the adhesive and barrier layers that is consistent with good adhesion but may also contribute to lower clarity.

Tie-layer adhesives of the invention can be used in numerous multilayer barrier film constructions, including structures having five, seven, nine, or more layers. Illustrative multilayer constructions include the following where "FCL" represents a food contact layer such as LDPE, LLDPE, EVA, ethylene-acrylic acid or ester copolymer, ethylene-methacrylic acid or ester copolymer, ionomers or the like:

HDPE/adhesive/EVOH/adhesive/HDPE
HDPE/adhesive/polyamide/adhesive/HDPE
EVOH/adhesive/HDPE/adhesive/EVOH
LDPE/adhesive/polyamide/adhesive/FCL
LDPE/adhesive/EVOH/adhesive/FCL
LLDPE/adhesive/EVOH/adhesive/FCL
LLDPE/adhesive/polyamide/adhesive/FCL
HDPE/adhesive/EVOH/adhesive/FCL
HDPE/adhesive/polyamide/adhesive/FCL Some commonly used sealable film constructions include:
LLDPE/adhesive/EVOH/adhesive/sealant
HDPE/adhesive/polyamide/adhesive/sealant
HDPE/adhesive/EVOH/adhesive/sealant where the sealant layer is, for example, EVA, LLDPE or ionomer.

The following examples merely illustrate the invention. Those skilled in the art will recognize many variations that are within the spirit of the invention and scope of the claims.

Example A

Graft [HDPE/EPR] Composition

High-density polyethylene (density: 0.957 g/cm$^3$; HLMI=3 g/10 min.) and maleic anhydride (2.0 wt. % based on charged reactants) are fed to a first Coperion ZSK-92 twin-screw extruder having zones heated at temperatures ranging from 450° F. to 660° F. (230 to 350° C.) and operated at shear rates within the range of 200 to 400 rpm to produce a grafted HDPE. The molten product exits the first extruder and immediately enters a second ZSK-92 twin-screw extruder, where it is combined and reacted with ethylene-propylene rubber (Vistalon® 722, product of ExxonMobil Chemical having 72 wt. % ethylene recurring units, 35 wt. % EPR based on the combined amounts of grafted HDPE and EPR). Conditions in the second extruder: temperature range: 300° F. to 450° F. (150 to 230° C.); shear rate: 200 to 400 rpm. The resulting graft [HDPE/EPR] product is cooled and pelletized.

By FTIR analysis (Thermo Scientific Nexus 870 FTIR spectrometer) of a pressed polymer film sample, the graft [HDPE/EPR] composition has 1.4 wt. % of grafted maleic anhydride (by comparison of the intensity of the 1790 cm$^{-1}$ absorbance with a standard calibration plot), which corresponds to essentially quantitative grafting efficiency. Additional similar runs with a 2.0 wt. % feed of maleic anhydride are analyzed by FTIR and are found to have grafted maleic anhydride contents ranging from 1.30 to 1.83 wt. %, each of which represents quantitative (or nearly quantitative) grafting efficiency.

The FTIR spectrum also shows a weak shoulder absorption in the range of 1720 to 1740 cm$^{-1}$, centered about 1730 cm$^{-1}$. This absorption is not observed in a comparison spectrum recorded for the grafted HDPE prepared for use in Comparative Examples 5-11, below.

Examples 1-4

Tie-Layer Adhesives from Graft [HDPE/EPR]

The pelletized graft [HDPE/EPR] composition from Example A (20-28 wt. %; see Table 1 for amount) is melt blended in the extruder at 200-240° C. and 210-250 rpm with Irganox 1010 antioxidant (0.1 wt. %), Irgafos 168 antioxidant (0.1 wt. %), and a 1-hexene-based LLDPE (density: 0.918 g/cm$^3$; MI$_2$: 2.0 g/10 min., balance to 100 wt. %) to produce a tie-layer adhesive.

Comparative Examples 5-11

Tie-Layer Adhesives from Dry or Melt Blends of Grafted HDPE, EPR and LLDPE

For the "dry blended" samples, grafted HDPE pellets are combined with Irganox 1010 (0.1 wt. %), Irgafos 168 (0.1 wt. %), pellets of 1-hexene-based LLDPE (density: 0.918 g/cm$^3$; MI$_2$: 2.0 g/10 min, 80 wt. %) and pellets of EPR (Vistalon® 722, 8-20 wt. %). The dry mixture is melted and mixed in the extruder (200-240° C., 210-250 rpm). The grafted HDPE is prepared by grafting maleic anhydride (2.0 wt. %) onto high-density polyethylene (density: 0.957 g/cm$^3$; HLMI=3 g/10 min.) under the temperature and shear conditions given for the first extruder in Example A. By FTIR, the grafted HDPE contains 1.6 wt. % of grafted maleic anhydride, which corresponds to about 80% grafting efficiency. Additional similar preparations of grafted HDPE with 2.0 wt. % charged maleic anhydride produce grafted HDPE having 1.6 to 1.7 wt. % grafted maleic anhydride, which corresponds to 80-85% grafting efficiency.

"Melt blended" samples are produced similarly except that the grafted HDPE and EPR are combined, melted, and mixed prior to melt blending this mixture with LLDPE and the antioxidants. Examples 1-4 demonstrate the uniqueness of the inventive graft [polyolefin/elastomer] compositions compared with melt blends of a grafted polyolefin and an elastomer as shown in Comparative Examples 7, 9, and 11.

Preparation and Testing of Multi-Layer Films and Sheets

Five-layer films (3 mils) and sheets (20 mils) are produced using the tie-layer adhesives of Examples 1-4 and Comparative Examples 5-11. Each multilayer film is made on a Killion extruder and has the structure: HDPE/tie layer/EVOH/tie layer/HDPE. HDPE is Alathon® M6210, product of Equistar Chemicals, LP, which has an MI$_2$ of 0.95 dg/min and density of 0.958 g/cm$^3$. Ethylene-vinyl alcohol copolymer (EVOH) is Soarnol® DC3203 FB grade, product of Nippon Gohsei Kagaku K.K., Japan. The layer distribution is 43%, 4%, 6%, 4%, and 43%, respectively.

Film and sheet samples are tested for adhesion according to ASTM D1876. The force required to separate the film apart in a T-peel configuration at 25.4 mm (10 inches)/min is measured using an Instron® tensile tester. The average adhesion of five specimens is recorded as the peel strength in lb/in. Adhesion values are reported in Table 2.

Film samples (5 mils) are also tested for clarity using narrow angle scattering (NAS) measurements. The NAS measurements are performed using a Zebedee CL-100 clarity meter. The samples are cut into 10×10 cm squares and adhered to the test unit in the front of the light source by air suction. The average clarity of seven specimens is recorded as the average clarity.

As shown in Tables 1 and 2, graft compositions of the invention are valuable components of tie-layer adhesives. The adhesives provide good adhesion and high clarity even when used at low concentrations. The graft

TABLE 1

Tie-Layer Adhesive Compositions

| Ex # | Graft[1] [HDPE/EPR], wt. % | EPR as graft [HDPE/EPR] in tie layer, wt. % | Grafted HDPE[1], wt. % | EPR[1], wt. % | Dry or Melt Blended? | Total Modifier, wt. % |
|---|---|---|---|---|---|---|
| 1 | 20 | 7.0 | — | — | — | 20 |
| 2 | 23 | 8.0 | — | — | — | 23 |
| 3 | 25 | 8.8 | — | — | — | 25 |
| 4 | 28 | 9.8 | — | — | — | 28 |
| C5 | — | — | 12 | 20 | dry | 32 |
| C6 | — | — | 12 | 8 | dry | 20 |
| C7 | — | — | 12 | 8 | melt | 20 |
| C8 | — | — | 12 | 10 | dry | 22 |
| C9 | — | — | 12 | 10 | melt | 22 |
| C10 | — | — | 12 | 13 | dry | 25 |
| C11 | — | — | 12 | 13 | melt | 25 |

[1]based on the amount of tie-layer adhesive composition.

TABLE 2

Multilayer Film and Sheet Properties

| Tie Layer of Ex # | One-Day Adhesion, 3-mil film, PLI | One-Day Adhesion, 20-mil sheet, PLI | NAS, 5-mil film, % |
|---|---|---|---|
| 1 | 1.59 | 17.6 | 28.1 |
| 2 | 1.64 | 18.5 | 35.0 |
| 3 | 1.75 | 18.6 | 34.7 |
| 4 | 1.69 | 19.0 | 32.6 |
| C5 | 1.56 | 15.8 | 26.0 |
| C6 | 1.35 | | |
| C7 | 1.17 | | |
| C8 | 1.30 | | |
| C9 | 1.14 | | |

TABLE 2-continued

Multilayer Film and Sheet Properties

| Tie Layer of Ex # | One-Day Adhesion, 3-mil film, PLI | One-Day Adhesion, 20-mil sheet, PLI | NAS, 5-mil film, % |
|---|---|---|---|
| C10 | 1.40 | | |
| C11 | 1.25 | | |

[1]Five-layer films and sheets comprise HDPE(43)/tie layer(4)/EVOH(6)/tie layer(4)/HDPE (43) in the weight ratios indicated.

composition provides superior results in the adhesive when compared with traditional mixtures of elastomers and grafted polyolefins.

In particular, Examples 1-4 demonstrate good one-day adhesion results (1.59-1.75 pounds per linear inch) from 3-mil five-layer films constructed from HDPE, EVOH, and a graft[HDPE/EPR] based tie-layer adhesive. As little as 20 wt. % graft[HDPE/EPR] provides superior adhesion results. See Comparative Example 5, in which a total of 32 wt. % of grafted HDPE and EPR blend in LLDPE is needed to give comparable adhesion (1.56 pli) to that obtained from 20 wt. % of graft[HDPE/EPR] in LLDPE (1.59 pli). A series of 20-mil sheets shows the same trend in the one-day adhesion test (see Table 2).

The negative impact of melt versus dry blending of grafted polyolefin and elastomer is evident in the comparative examples, with the adhesion values lower in the melt-blended examples (Comparative Examples 7, 9, and 11), perhaps reflecting the greater thermal history of these samples.

Improved grafting efficiency and adhesion normally counterbalance with poorer see-through clarity, so the narrow-angle scattering (NAS) results for 20-mil sheets shown in Table 2 are a pleasant surprise. In particular, adhesives that incorporate a graft[HDPE/EPR] composition (Examples 1-4) showed an 8-35% improvement in clarity when compared with the adhesive based on a traditional blend of grafted HDPE and EPR (Comparative Example 5).

In sum, the inventive graft compositions can be used at unusually low concentrations to make tie layers with improved adhesion and high-clarity in the manufacture of multilayer structures.

The preceding examples are meant only as illustrations. The following claims define the invention.

I claim:

1. A composition comprising:
   a graft (polyolefin/elastomer) copolymer wherein the copolymer comprises:
   (i) a grafted polyolefin; and,
   (ii) an olefin elastomer
   wherein the graft (polyolefin/elastomer) copolymer is produced by a radical coupling reaction between a live, grafted polyolefin and the olefin elastomer.

2. The composition of claim 1 wherein the grafted polyolefin is high-density polyethylene (HDPE) grafted with maleic anhydride.

3. The composition of claim 1 wherein the olefin elastomer is ethylene-propylene rubber (EPR) or ethylene-propylene-diene monomer rubber (EPDM).

4. The composition of claim 1 which exhibits an infrared absorption in the range of 1725 to 1735 $cm^{-1}$.

5. The composition of claim 1 comprising:
   2 to 50 wt. % of the graft (polyolefin/elastomer) copolymer and 50-98 wt. % of a resin.

6. The composition of claim 5 comprising:
   5 to 30 wt. % of the graft (polyolefin/elastomer) copolymer and 70 to 95 wt. % of the resin.

7. The composition of claim 6 wherein the grafted polyolefin is a maleic anhydride-grafted polyethylene, and the resin comprises a LLDPE.

8. The composition of claim 5 wherein the grafted polyolefin is a maleic anhydride-grafted polyethylene, and the resin is ethylene-vinyl acetate (EVA) copolymer.

9. The composition of claim 5 wherein the resin comprises at least one compound selected from the group consisting of: an ethylene homopolymer; a copolymer of ethylene with $C_3$-$C_8$ α-olefins; a vinyl carboxylate; an alkyl acrylate; a terpolymer of ethylene and propylene with diene monomers; a propylene homopolymer; a polyisobutylene; a copolymer of isobutylene; and a copolymer of isoprene.

10. The composition of claim 9 wherein the resin comprises at least one compound selected from the group consisting of a LDPE, a MDPE, a HDPE, a LLDPE, a very low density polyethylene, an ultra-low density polyethylene, and blends thereof.

11. The composition of claim 9 wherein the resin comprises at least one compound selected from the group consisting of an ethylene-vinyl acetate (EVA) copolymer, an ethylene-acrylate copolymer, an ethylene-ethyl acrylate copolymer, an ethylene-n-butyl acrylate copolymer, and blends thereof.

12. The composition of claim 5 wherein the composition is capable of acting as an adhesive that adheres one layer of a multilayered structure to a second layer of the multilayered structure.

13. The composition of claim 12 wherein the multilayered structure comprises one or more polyethylene layers and one or more barrier layers.

14. The composition of claim 13 wherein the multilayered structure exhibits higher adhesion and higher clarity when compared to a film or sheet comprising, as a tie-layer adhesive, an unreacted blend of a grafted polyolefin and an olefin elastomer.

15. A process for making a graft composition, comprising:
   (a) heating a polyolefin and an unsaturated monomer, optionally in the presence of a free-radical initiator, under conditions effective to produce a live, grafted polyolefin, and
   (b) further reacting the live, grafted polyolefin and any residual polyolefin and/or unsaturated monomer with an olefin elastomer.

16. The process of claim 15 wherein after step (b) at least 90% of the unsaturated monomer is incorporated into the composition.

17. The process of claim 16 wherein after step (b) at least 98% of the unsaturated monomer is incorporated into the composition.

18. The process of claim 15 wherein the polyolefin is HDPE, the unsaturated monomer is maleic anhydride, and the olefin elastomer is EPR or EPDM.

19. The process of claim 15 which is integrated with a polyethylene production process such that polyethylene powder is blended in line with the graft composition to generate a mixture that is useful as a masterbatch or as a tie-layer adhesive.

20. The process of claim 19 wherein the polyethylene is LLDPE, the grafted polyolefin is maleic anhydride-grafted polyethylene, and the olefin elastomer is EPR or EPDM.

* * * * *